United States Patent
Xiang et al.

(10) Patent No.: US 8,379,203 B2
(45) Date of Patent: Feb. 19, 2013

(54) SPECTROMETERS WITH ABERRATION-CORRECTED CONCAVE DIFFRACTION GRATINGS AND TRANSMISSIVE ABERRATION CORRECTORS

(76) Inventors: Lian-Qin Xiang, Acton, MA (US);
Andrew Xiang, Littleton, MA (US)

(*) Notice: Subject to any disclaimer, the term of this patent is extended or adjusted under 35 U.S.C. 154(b) by 345 days.

(21) Appl. No.: 12/809,802

(22) PCT Filed: Oct. 19, 2009

(86) PCT No.: PCT/US2009/061138
§ 371 (c)(1),
(2), (4) Date: Jun. 21, 2010

(87) PCT Pub. No.: WO2010/048073
PCT Pub. Date: Apr. 29, 2010

(65) Prior Publication Data
US 2010/0277732 A1    Nov. 4, 2010

Related U.S. Application Data

(60) Provisional application No. 61/196,648, filed on Oct. 20, 2008.

(51) Int. Cl.
*G01J 3/28* (2006.01)
(52) U.S. Cl. ............................................. 356/328
(58) Field of Classification Search ................. 356/326, 356/328, 334
See application file for complete search history.

(56) References Cited

U.S. PATENT DOCUMENTS

2006/0038997 A1 * 2/2006 Julian et al. ................. 356/328
2009/0237657 A1 * 9/2009 Warren ....................... 356/328

* cited by examiner

*Primary Examiner* — Tarifur Chowdhury
*Assistant Examiner* — Abdullahi Nur
(74) *Attorney, Agent, or Firm* — Milstein Zhang & Wu LLC

(57) ABSTRACT

The invention generally relates to spectrometers and optical systems useful therein. More particularly, the invention generally relates to optical systems and systems having improved functionalities, flexibilities, and design options. For example, optical systems of the invention employ an aberration-corrected concave grating along with one or more transmissive aberration correctors.

24 Claims, 10 Drawing Sheets

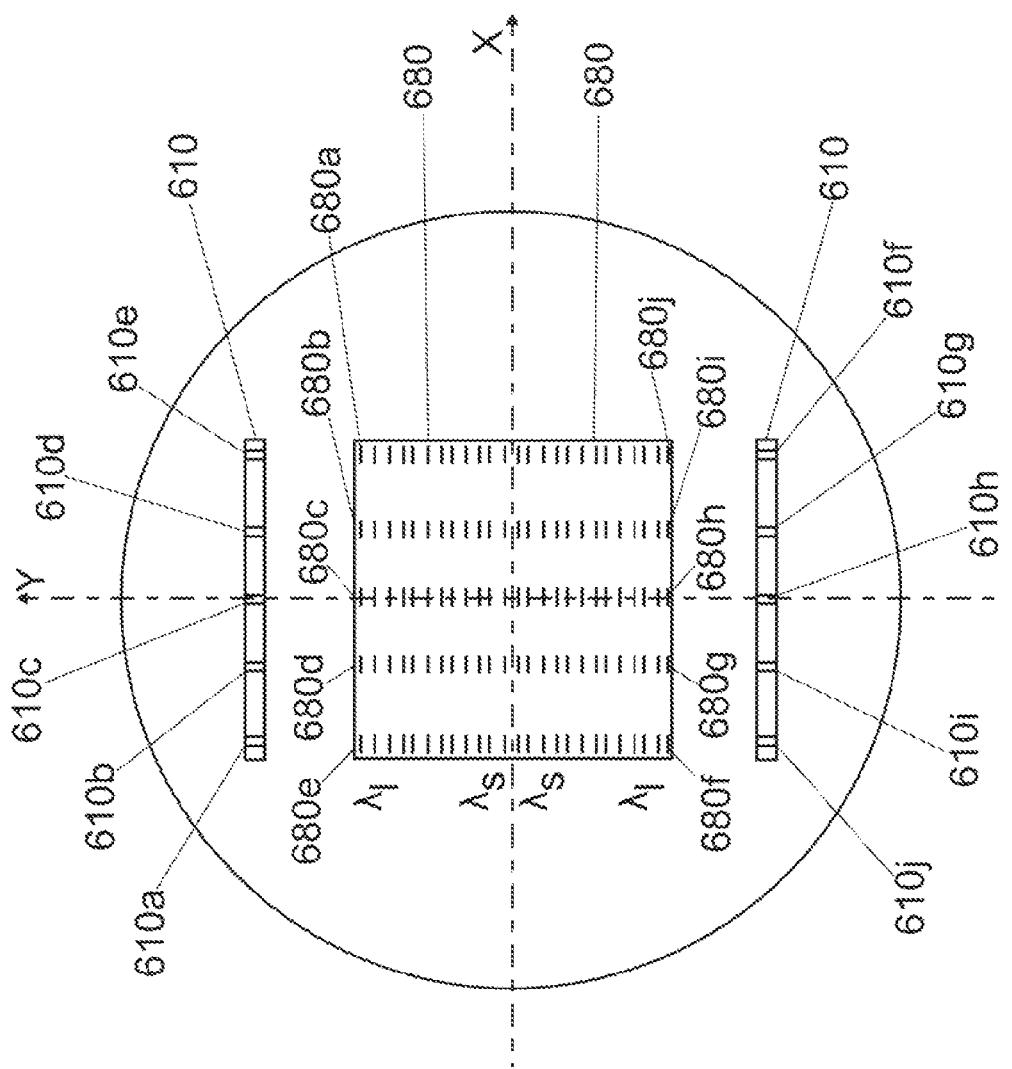

| Optical material | Transmission Range(um) |
|---|---|
| MgF2 | 0.13-8.0 |
| CaF2 | 0.15-8.0 |
| Standard Fused Silica | 0.2-2.0 |
| UV grade Fused Silica | 0.18-2.0 |
| Bk7, Schott | 0.35-2.0 |
| SF11, Schott | 0.5-2.5 |
| Saphire | 0.3-5.0 |
| znSe | 0.5-20 |
| Ge | 2.0-20 |
| Si | 1.0-10 |

FIG. 7

SPECTROMETERS WITH ABERRATION-CORRECTED CONCAVE DIFFRACTION GRATINGS AND TRANSMISSIVE ABERRATION CORRECTORS

PRIORITY CLAIMS AND RELATED APPLICATIONS

This application claims the benefit of U.S. Provisional Application No. 61/196,648, filed Oct. 20, 2008, the entire content of which is expressly incorporated herein by reference.

FIELD OF THE INVENTION

The invention generally relates to spectrometers and optical systems useful therein. More particularly, the invention generally relates to optical systems having improved functionalities, flexibilities, and design options.

BACKGROUND OF THE INVENTION

A spectrometer is an instrument used to measure and/or record properties of radiation such as visible or invisible light over a specific portion of the electromagnetic spectrum. A spectrometer separates incoming radiation into a frequency or wavelength spectrum and is used in spectroscopic analysis to identify and analyze materials, for example. Spectrometers produce spectral lines (energy bands) which allow measurement, recordation and analyses of components wavelengths and intensities thereof. Spectrometers typically operate over a pre-selected range of wavelengths, from gamma rays and X-rays into the far infrared, for example.

Spectrometers have evolved over time and have been designed for different applications and utilities. While functionalities and qualities have improved from the traditional Czerny-Turner system, significant challenges remain in designing spectrometers that allow the combination of high quality spectroscopy, flexibility in system design and system, and unique functionalities.

SUMMARY OF THE INVENTION

The invention is based in part on the unexpected discovery of a novel spectrometer optical system that possesses a unique combination of various desired advantages, including superior functionalities, design flexibilities, and high quality spectroscopy. As will be discussed later, optical systems of the invention employ an aberration-corrected concave grating along with one or more transmissive aberration correctors.

For example, two transmissive material units and used as the aberration correctors, one in the path of incoming radiation to a concave diffraction grating and the other in the path of the diffracted light before it hits the image plane.

Beneficial features of the optical systems and spectrometers of the invention include:

(1) The system includes an aberration-corrected concave grating, for example with non-equal spaced and curved fringe patterns. A particular fringe pattern (e.g., grooves) may be designed in association with the transmissive aberration corrector(s) for particular applications or utilities. This feature allows much more freedom and flexibility in the design and arrangement of the optical components in particular and the optical system in general. Additional geometric freedom and positioning options among the entrance slit, the aberration corrector(s), the concave grating, and the image recorder (or detector) enable the spectrometers of the invention to provide unique functionalities and utilities.

(2) In common flat field concave grating, its flatness of spectral image plane and its spatial resolution is improved from those in Rowland gratings. But there are still not good enough, especially when the field of view increases. The optical system of the invention is superior to common flat field concave gratings in both spectral resolution and spatial resolution in large field of view.

(3) The optical systems of the invention offers superior dispersion than reflective Offner spectrometers, where dispersion cannot be large as the diffraction beam would be blocked by the convex grating if the dispersion of the grating increases beyond a certain threshold. The optical systems of the invention are not so constrained.

(4) The optical systems of the invention allow dimension flexibilities. For example, more compact imaging spectrometer systems may be designed.

In one aspect, the invention generally relates to an optical assembly. The optical system includes: an entrance (slit or aperture) for receiving a radiation from a source object; a first transmissive aberration corrector in optical communication with the entrance; an aberration-corrected concave diffraction grating in optical communication with the first transmissive aberration corrector, wherein the aberration-corrected concave diffraction grating includes a plurality of grooves that are non-parallel and unequally-spaced; a second transmissive aberration corrector in optical communication with aberration-corrected concave diffraction grating; and an image plane in optical communication with the second transmissive aberration corrector for recording a spectral image of the entrance slit. The radiation of the source object is refracted through the first transmissive aberration corrector, projected onto and diffracted from the aberration-corrected concave diffraction grating, refracted through the second transmissive aberration corrector before projected on to the image plane to form the spectral image of the entrance.

In certain embodiments, the first and/or second transmissive aberration corrector includes a transparent block of material that is transmissive to radiation having a wavelength of from about 0.13 µm to about 20 µm. In certain embodiments of the optical assembly, the first and/or second transmissive aberration corrector comprises a transparent block of material that is transmissive to radiation having a wavelength of from about 0.2 µm to about 2.5 µm.

In some other embodiments, the aberration-corrected concave diffraction grating includes non-parallel and unequally spaced grooves. In certain embodiments, the aberration-corrected concave diffraction grating includes non-parallel and unequally spaced grooves having a density from about 50 lines/mm to about 3,000 lines/mm. In certain embodiments, the aberration-corrected concave diffraction grating includes non-parallel and unequally spaced grooves having a density from about 200 lines/mm to about 2,000 lines/mm.

The first and second transmissive aberration correctors may be made of $MgF_2$, UV grade fused silica, standard grade fused silica, BK7, Sapphire, Ge or Si (or a combination thereof), for example.

The aberration-corrected concave diffraction grating may be made of any appropriate materials known in the art or later developed such as photoresistors, metal coatings (such as aluminum, gold), protective layer of materials such as $MgF_2$. The support substrate on which the grating is made may be plastics, glass or metals, for example.

The optical system may include a single channel, i.e., a single entrance and a corresponding image plane (or exit) or two or more entrances and corresponding image planes (or exits).

In another aspect, the invention generally relates to an optical system that include: an entrance (slit or aperture) for receiving a radiation from a source object; a transmissive aberration corrector in optical communication with the receiving slit; an aberration-corrected concave diffraction grating in optical communication with the first transmissive aberration corrector, wherein the aberration-corrected concave diffraction grating includes a plurality of grooves that are non-parallel and unequally-spaced; and an image plane in optical communication with the transmissive aberration corrector again for recording a spectral image of the entrance slit. The radiation of the source object is refracted through the transmissive aberration corrector, projected onto and diffracted from the aberration-corrected concave diffraction grating, and refracted through the transmissive aberration corrector again before projected on to the image plane to form the spectral image of the entrance.

In yet another aspect, the invention generally relates to a method for imaging a radiation. The method includes: receiving a radiation from a source object; refracting the radiation through a first transmissive aberration corrector; projecting the refracted radiation onto an aberration-corrected concave diffraction grating thereby generating a diffracted radiation from the diffraction grating, wherein the aberration-corrected concave diffraction grating includes a plurality of grooves that are non-parallel and unequally-spaced; refracting the diffracted radiation through the second transmissive aberration corrector; and projecting the refracted radiation from the second transmissive aberration corrector on to the image plane to form a spectral image.

The radiation to be imaged (e.g., analyzed, measured, or recorded) using the optical systems of the invention may comprise a beam having a wavelength, for example, from about 0.12 µm to about 20 µm; from about 0.2 µm to about 2.5 µm.

In yet another aspect, the invention generally relates to a method for imaging a radiation. The method includes: receiving a radiation from a source object; refracting the radiation through a transmissive aberration corrector; projecting the refracted radiation onto an aberration-corrected concave diffraction grating thereby generating a diffracted radiation from the diffraction grating, wherein the aberration-corrected concave diffraction grating includes a plurality of grooves that are unparallel and not equally-spaced; refracting the diffracted radiation through the transmissive aberration corrector; and projecting the refracted radiation from the transmissive aberration corrector on to the image pine to form a spectral image.

BRIEF DESCRIPTION OF THE DRAWINGS

FIG. 7 lists exemplary materials and related information on transmission ranges that may be used to make components of the optical systems disclosed herein.

DETAILED DESCRIPTION OF THE INVENTION

A novel spectrometer optical system is provided herein that possesses a unique combination of various desired advantages, including superior functionalities, design flexibilities, and high quality spectroscopy. Optical systems of the invention employ an aberration-corrected concave grating along with one or more transmissive aberration correctors. For example, two transmissive material units and used as the aberration correctors, one in the path of incoming radiation to a concave diffraction grating and the other in the path of the diffracted light before it hits the image plane.

Figure 1:
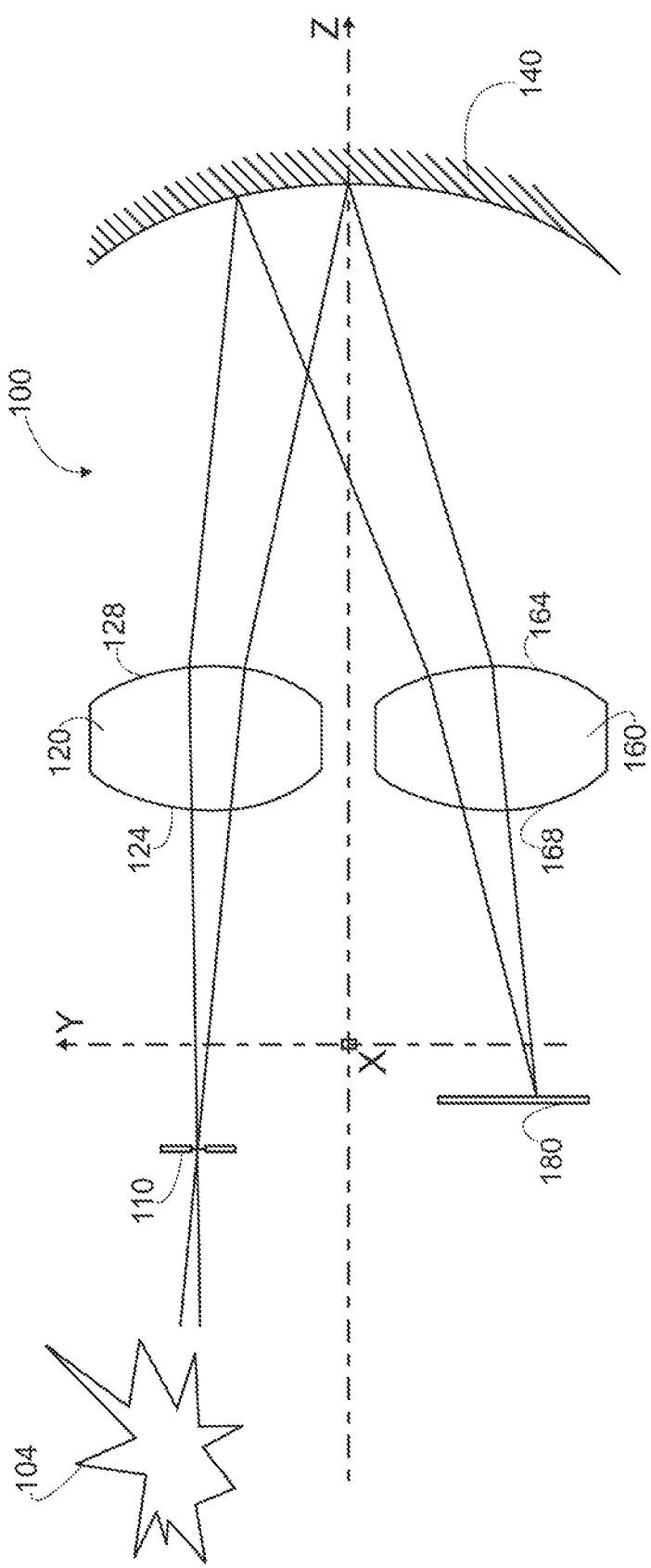
FIG. 1 schematically illustrates an exemplary embodiment of the optical systems of the invention.

FIG. 1 schematically illustrates an embodiment of the optical system of the invention. The optical system 100 includes an entrance 110 (a slit or an aperture), which receives a radiation from a source object 104, which in general is not part of the optical system, a first transmissive aberration corrector 120 that is in optical communication with the entrance 110, an aberration-corrected concave diffraction grating 140 in optical communication with the first transmissive aberration corrector 120, a second transmissive aberration corrector 160 that is in optical communication with the aberration-corrected concave diffraction grating 140, and an image plane 180 (for display, measurement or recording) that is in optical communication with the aberration-corrected concave diffraction grating 140. The first transmissive aberration corrector 120 includes a receiving surface 124 in optical communication with the entrance 110 and an output surface 128 in optical communication with the aberration-corrected concave diffraction grating 140. The second transmissive aberration corrector 160 includes a receiving surface 164 in optical communication with the aberration-corrected concave diffraction grating 140 and an output surface 168 in optical communication with the image plane 180.

In this embodiment, radiation from the source object 104 is first passed through the entrance 110 and is then passed through the first transmissive aberration corrector 120. The transmitted radiation beam arrives at the aberration-corrected concave diffraction grating 140 and is diffracted therefrom. The diffracted radiation is passed through the second transmissive aberration corrector 160, after which the radiation is focused on the image plane 180 for display, measurement or recording.

Figure 2:
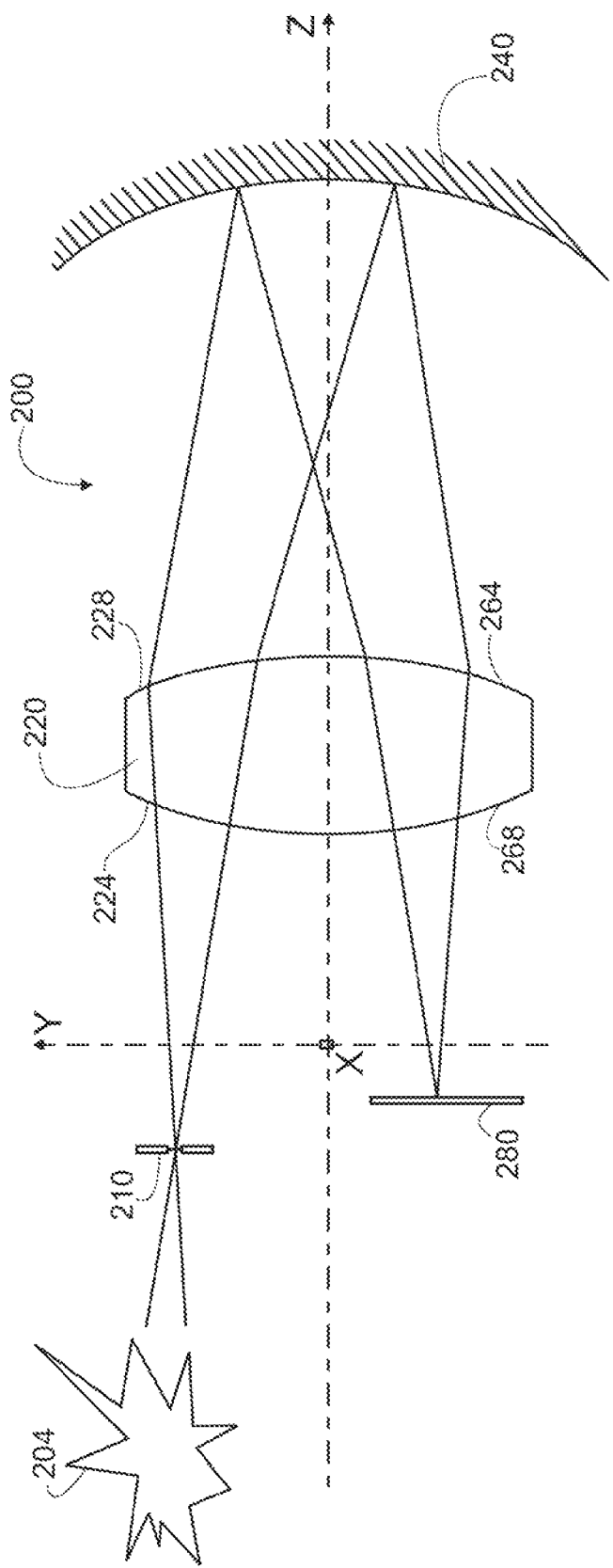
FIG. 2 schematically illustrates an exemplary embodiment of the optical systems of the invention.

FIG. 2 schematically illustrates another embodiment of the optical system of the invention. The optical system 200 includes an entrance 210 (a slit or an aperture), which receives a radiation from a source object 204, which in general is not part of the optical system, a transmissive aberration corrector 220 that is in optical communication with the entrance 210, an aberration-corrected concave diffraction grating 240 in optical communication with the transmissive aberration corrector 220, and an image plane 280 (for display, measurement or recording) that is in optical communication with the transmissive aberration corrector 220. The transmissive aberration corrector 220 includes a receiving surface 224 in optical communication with the entrance 210 and an output surface 228 in optical communication with the aberration-corrected concave diffraction grating 240. The transmissive aberration corrector 220 is also in the optical path between the aberration-corrected concave diffraction grating 240 and the image plane 280, where radiation is radiation is received by the receiving surface 264 and emitted from output surface 268. In this embodiment, the output surface 228 and the receiving surface 264 form a surface of the transmissive aberration corrector 220 (although the output surface 228 and the receiving surface 264 may have different curvatures). Similarly, the receiving surface 224 and the output surface 268 form another surface of the transmissive aberration corrector 220 (although the receiving surface 224 and the output surface 268 may have different curvatures).

In this embodiment, radiation from the source object 204 is first passed through the entrance 210 and is then passed through the transmissive aberration corrector 220. The transmitted radiation beam arrives at the aberration-corrected concave diffraction grating 240 and is diffracted therefrom. The diffracted radiation is passed through the transmissive aberration corrector 260 after which the radiation is focused on the image plane 280 for display, measurement or recording.

A diffraction grating is a spectral optical component which separates an incident polychromatic beam into its constituent wavelength components, i.e., it is dispersive and directs component beams into different directions. The directions of these beams depend on the fringe spacing of the grating, the wavelength of the light, the incident angle of light and diffraction order.

Figure 3A:
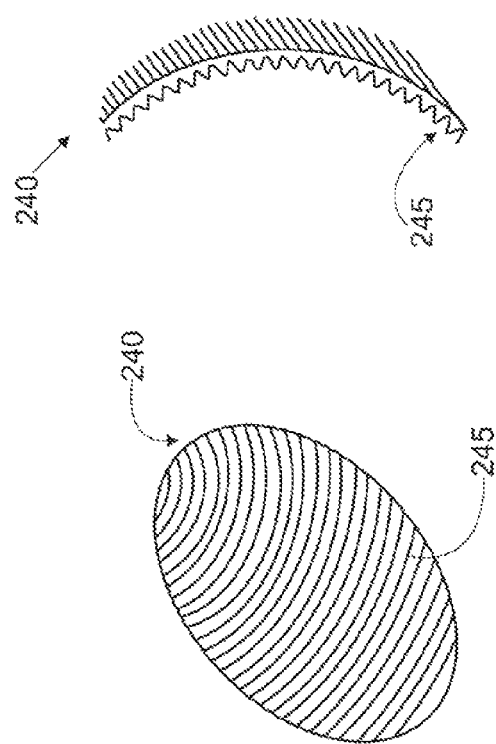
FIG. 3 schematically illustrates an exemplary embodiment of the diffraction grating the invention.
Figure 3B:
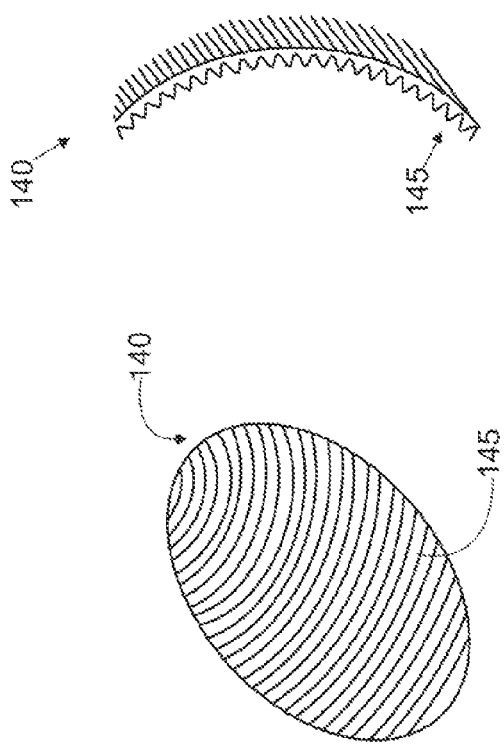
Figure 4A:
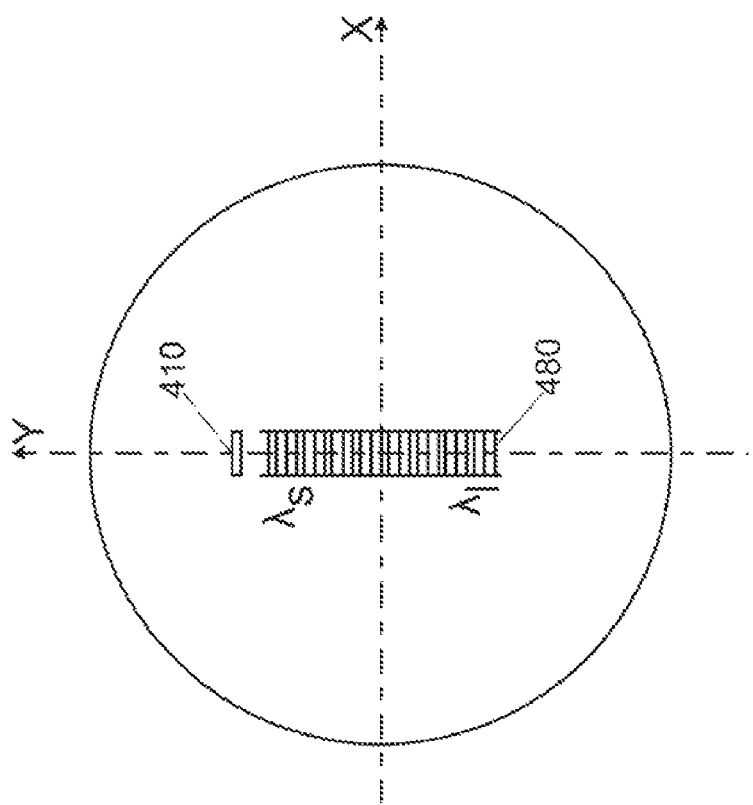
FIG. 4 schematically illustrates exemplary single channel systems according to the invention.
Figure 4B:
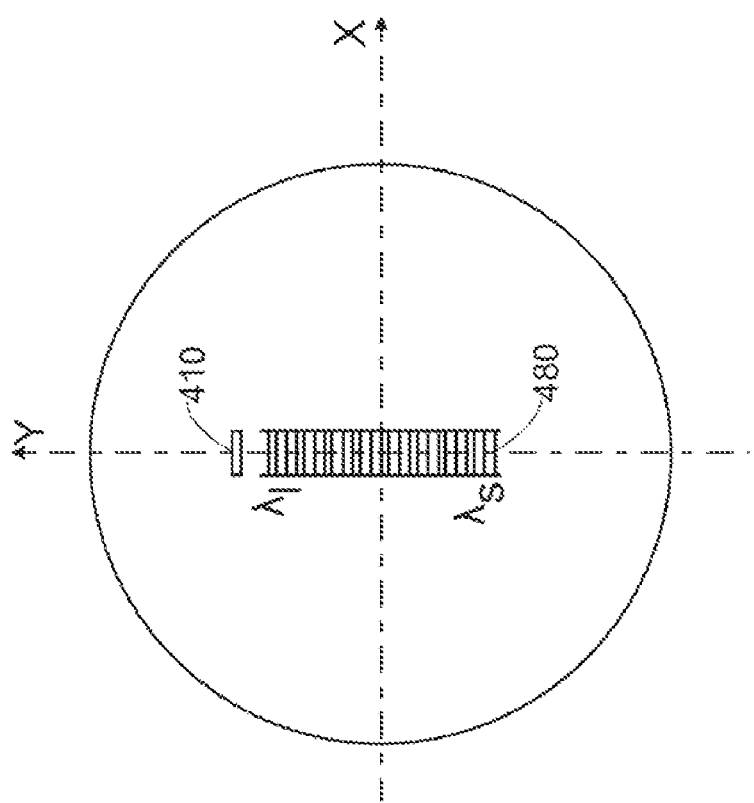
Figure 4D:
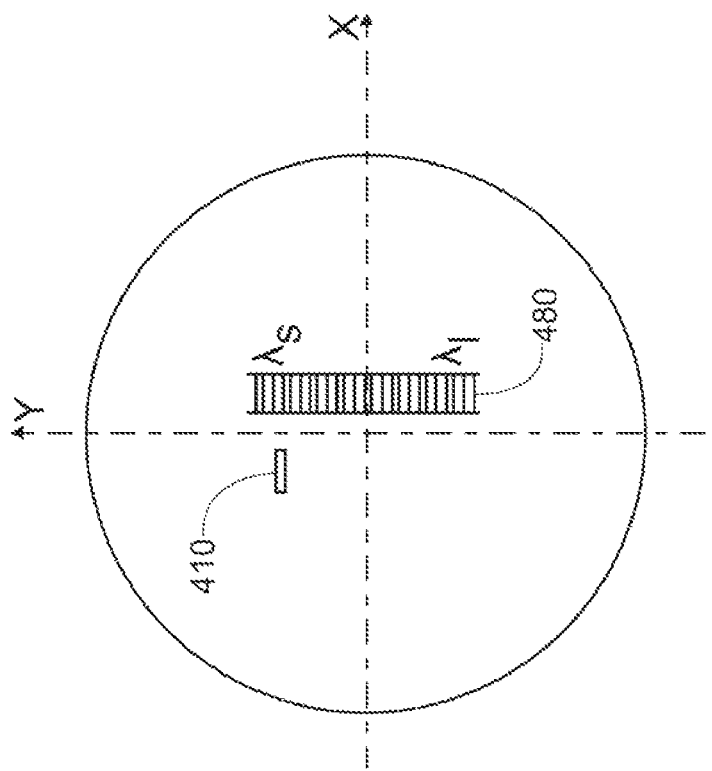
Figure 4C:
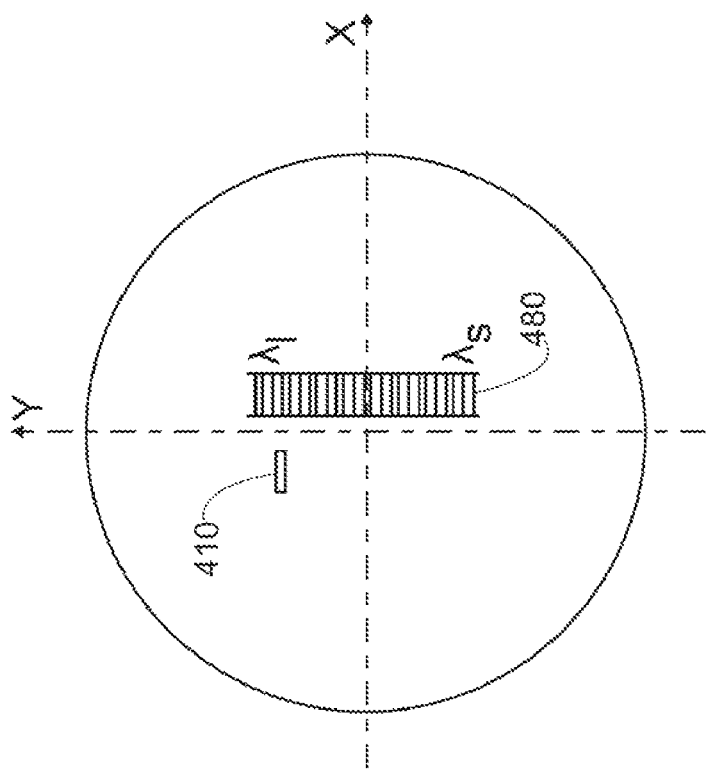

FIG. 3 schematically illustrates an embodiment of the aberration-corrected concave diffraction grating 140 (and 240) according to the invention. A portion of the concave diffraction grating 140 (and 240) is depicted. Grooves 145 (and 245) are etched or otherwise produced on the grating. The groove lines in this embodiment are not straight (i.e., curved) and are non-equally spaced. The grooves 145 (and 245) are generally non-parallel (although may be parallel and equally spaced for certain applications). The diffraction concave grating 145 (and 245) spatially disperses light by wavelengths of component colors (with each color diffracted along a distinct direction).

The material and formation of the diffraction grating may be selected and accomplished dependent on the applications. Table 1 lists examples of materials useful for manufacturing of the diffraction gratings of the invention.

TABLE 1

Exemplary Materials useful for Manufacturing of Diffraction Gratings

Protective materials
Metal coatings
Photoresistant materials
Plastic, glass or metal substrate A useful method for producing gratings is to use a diamond or similar tools to mechanically create the lines into the surface of the grating substrate such as a metal or plastic material. Mechanical ruling typically produces a grating having a triangular or staircase style cross-section.

Photolithographic techniques allow gratings to be created from a holographic interference pattern. This is usually called holographic gratings. Holographic gratings have sinusoidal grooves and may not be as efficient as ruled gratings.

In one aspect, the invention generally relates to an optical system. The optical system includes: an entrance (slit or aperture) for receiving a radiation from a source object; a first transmissive aberration corrector in optical communication with the entrance; an aberration-corrected concave diffraction grating in optical communication with the first transmissive aberration corrector, wherein the aberration-corrected concave diffraction grating includes a plurality of grooves that are non-parallel and unequally-spaced; a second transmissive aberration corrector in optical communication with aberration-corrected concave diffraction grating; and an image plane in optical communication with the second transmissive aberration corrector for recording a spectral image of the entrance slit. The radiation of the source object is refracted through the first transmissive aberration corrector, projected onto and diffracted from the aberration-corrected concave diffraction grating, refracted through the second transmissive aberration corrector before projected on to the image plane to form the spectral image.

The entrance is designed according to the application and is used to receive a radiation from the object source. The entrance may be a slit or an aperture of appropriate shape and dimension.

In certain embodiments, the first transmissive aberration corrector comprises a transparent block of material that is transmissive to radiation having a wavelength of from about 0.13 μm to about 20 μm. In certain embodiments of the optical system, the first transmissive aberration corrector comprises a transparent block of material that is transmissive to radiation having a wavelength of from about 0.2 μm to about 2.5 μm.

In certain other embodiments the optical system, the second transmissive aberration corrector comprises a transparent block of material that is transmissive to radiation having a wavelength of from about 0.13 μm to about 20 μm. In certain embodiment of the optical system, the second transmissive aberration corrector comprises a transparent block of material that is transmissive to radiation having a wavelength of from about 0.2 μm to about 2.5 μm.

In some embodiments, the aberration-corrected concave diffraction grating includes non-parallel and unequally spaced grooves. In certain preferred embodiments, the aberration-corrected concave diffraction grating includes non-parallel and unequally spaced grooves having a density from about 50 lines/mm to about 3,000 lines/mm. In certain preferred embodiments, the aberration-corrected concave diffraction grating includes non-parallel and unequally spaced grooves having a density from about 200 lines/mm to about 2,000 lines/mm.

Depending on the specific application and design, the first transmissive aberration corrector may include a flat or curved receiving surface that is in optical communication with the entrance.

Depending on the specific application and design, the first transmissive aberration corrector may include a curved output surface in optical communication with the aberration-corrected concave diffraction grating (although rarely the first transmissive aberration corrector could include a flat output surface in optical communication with the aberration-corrected concave diffraction grating).

Depending on the specific application and design, the second transmissive aberration corrector may include a curved receiving surface that is in optical communication with the grating (although rarely but in some embodiments, the second transmissive aberration corrector could include a flat receiving surface in optical communication with the grating).

Depending on the specific application and design, the second transmissive aberration corrector may include a flat or curved output surface in optical communication with the image plane.

The first and second transmissive aberration correctors may be made of $MgF_2$, UV grade fused silica. BK7 (Schott), Sapphire, Ge or Si (or a combination thereof), for example.

The aberration-corrected concave diffraction grating may include a plastic material, a glass material, metal (or a combination thereof).

The optical system may include a single channel, i.e., a single entrance and a corresponding image plane (or exit), where the spatial resolution is not required among points from this entrance. For instance, FIG. 4a-d schematically illustrates exemplary single channel systems (e.g., image spectrometers) according to the invention. The figures depict exemplary relative positions of the entrance (410) and the image plane (480) as well as spectral direction (i.e., shorts wavelength ($\lambda_s$) vs longer wavelength ($\lambda_l$))

Figure 5B:
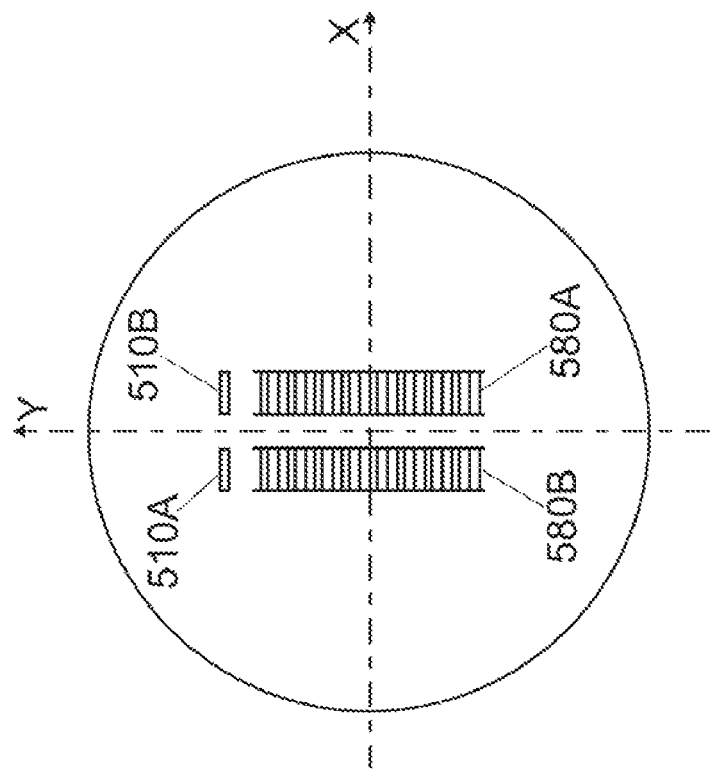
FIG. 5 schematically illustrates exemplary two- (or duel-) channel systems according to the invention.
Figure 5A:
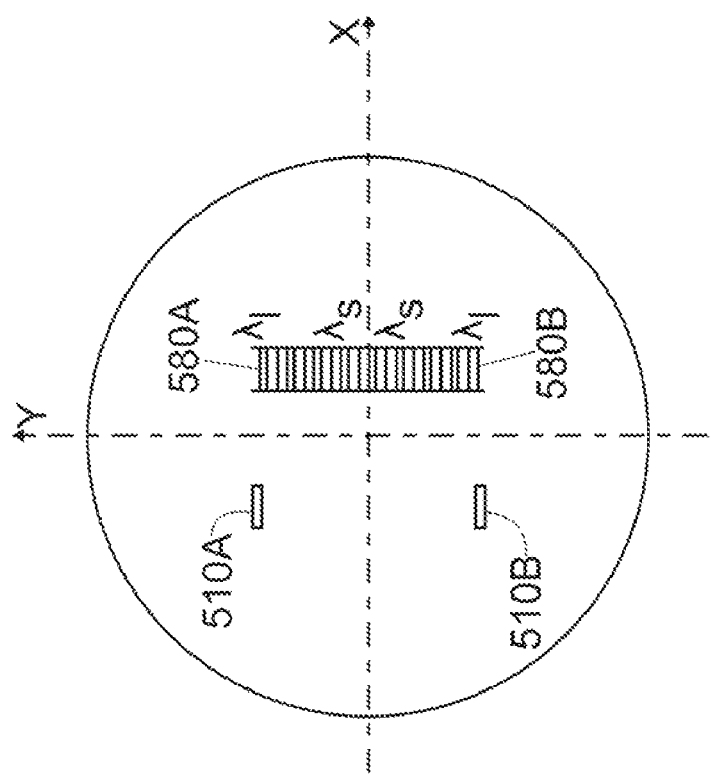
Figure 5C:
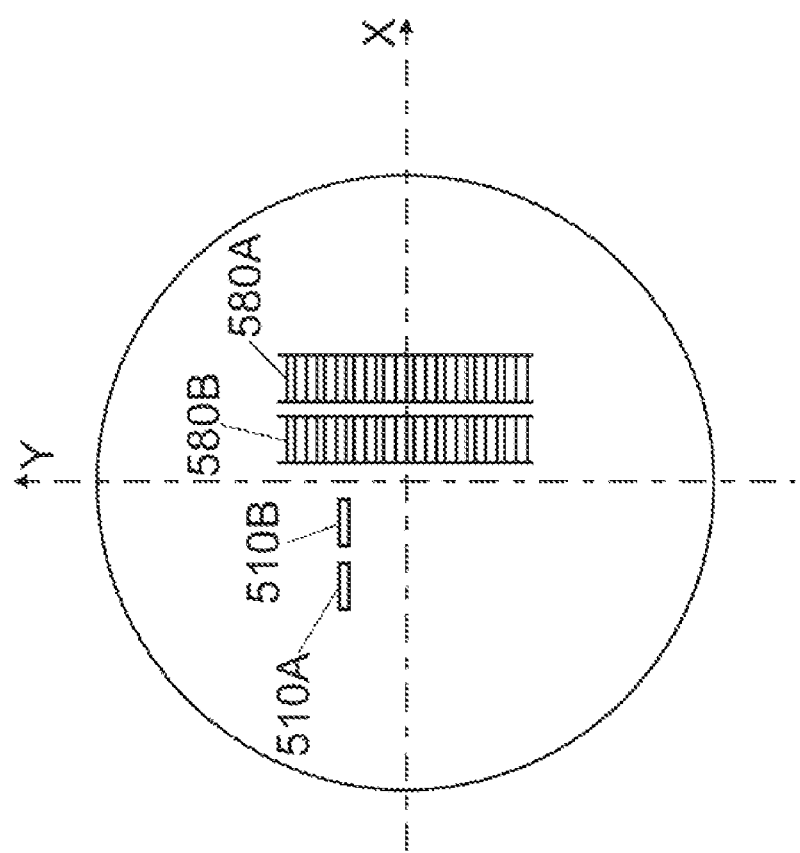

The optical system may also include two or more entrances and corresponding image planes (or exits), where the spatial resolution is not required among points from the same entrance. For instance, FIG. 5a-c schematically illustrates exemplary two- (or duel-) channel systems according to the invention. One channel is generally used as a reference, while the other channel is used for spectral information of the tested object. In FIG. 5a-c, entrance 510 and entrance 510' correspond to image planes (or exits) 580 and 580', respectively. It is noted here that entrances 510 and 510' and image planes 580 and 580' may or may not be co-planner.

In FIG. 5a, wavelengths of the image planes are geometrically aligned in opposite directions corresponding to the respective entrances, i.e., the wavelength gets longer in opposite direction. In FIG. 5b, wavelengths of the image planes are geometrically parallel in the same directions corresponding to the respective entrances, i.e., the wavelength gets longer in the same direction.

In FIG. 5c shows a setup where the two image planes (exits) are parallel and to the same side of the two entrances.

Figure 6B:
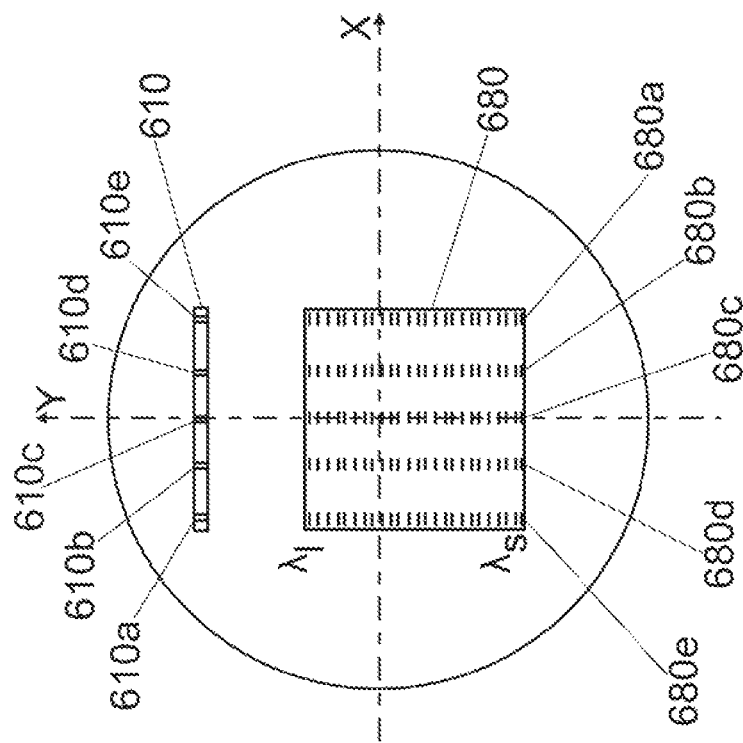
FIG. 6 schematically illustrates exemplary spectral image system according to the invention.
Figure 6A:
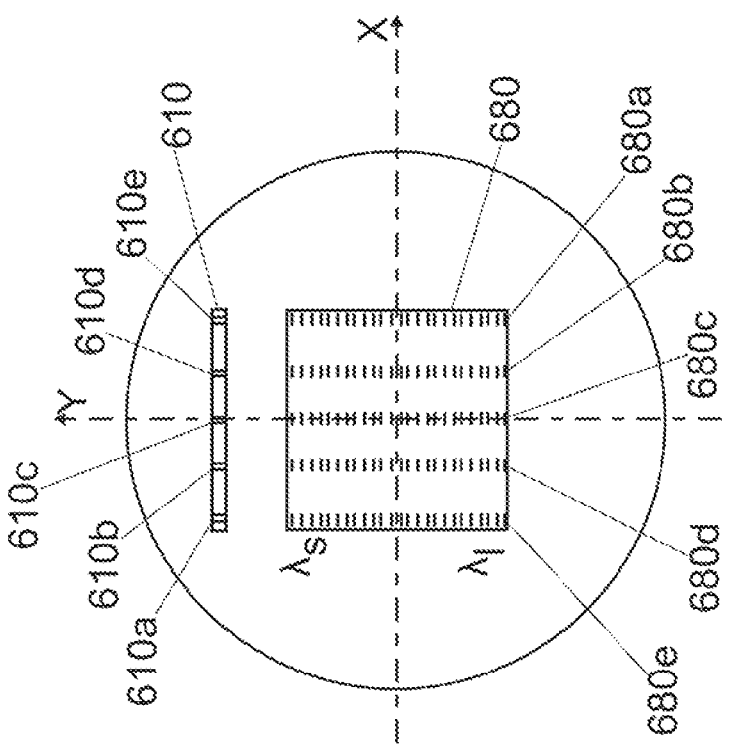

FIG. 6a-b are schematic illustrations of two embodiments of a one-channel imaging spectrometer. FIG. 6c is a schematic illustration of one embodiment of a duel-channel imaging spectrometer. An "imaging spectrometer" here refers to a spectrometer that provides both spectral resolution and spatial resolution of an image.

In certain embodiments, the optical system includes two entrances each of which is receiving a radiation from a source object, and two image planes, corresponding to the two entrances respectively (thus a "duel channel" setup), each of the image planes is in optical communication with the second transmissive aberration corrector for recording a spectral image of the corresponding entrance. The two image planes may be geometrically inverse in the display of component wavelengths in relation to the corresponding two entrances.

In another aspect, the invention generally relates to an optical system that include: an entrance (slit or aperture) for receiving a radiation from a source object; a transmissive aberration corrector in optical communication with the receiving slit; an aberration-corrected concave diffraction grating in optical communication with the first transmissive aberration corrector, wherein the aberration-corrected concave diffraction grating includes a plurality of grooves that are non-parallel and unequally-spaced; and an image plane in optical communication with the second transmissive aberration corrector for recording a spectral image of the entrance slit. The radiation of the source object is refracted through the transmissive aberration corrector, projected onto and diffracted from the aberration-corrected concave diffraction grating, and refracted through the transmissive aberration corrector again before projected on to the image plane to form the spectral image.

In general, discussions in connection with the "duel" aberration corrector (120 and 160) system as exemplified in FIG. 1 are relevant and applicable to the "single" aberration corrector 220 set up as exemplified in FIG. 2, for example, in respect to materials, design and setup. In general and referring to FIG. 2, the transmissive aberration corrector 200 may include a flat or curved receiving surface 224 in optical communication with the entrance and a curved output surface 228 in optical communication with the aberration-corrected concave diffraction grating (although in rare cases, surface 228 could be made flat).

Again referring to FIG. 2, the transmissive aberration corrector 200 may include a curved receiving surface 264 in optical communication with the entrance (although in rare cases, surface 264 could be made flat) and a flat or curved output surface 268 in optical communication with the aberration-corrected concave diffraction grating.

In certain embodiments of the aberration corrector (single or duel) setup, the optical system may include two entrances each of which is receiving a radiation from a source object, and two image planes, corresponding to the two entrances respectively (thus a "duel channel" setup), each of the image planes is in optical communication with the second transmissive aberration corrector for recording a spectral image of the corresponding entrance. The two image planes may be geometrically inverse in the display of component wavelengths in relation to the corresponding two entrances.

In yet another aspect, the invention generally relates to a method for imaging a radiation. The method includes: receiving a radiation from a source object; refracting the radiation through a first transmissive aberration corrector; projecting the refracted radiation onto an aberration-corrected concave diffraction grating thereby generating a diffracted radiation from the diffraction grating, wherein the aberration-corrected concave diffraction grating includes a plurality of grooves that are non-parallel and unequally-spaced; refracting the diffracted radiation through the second transmissive aberration corrector; and projecting the refracted radiation from the second transmissive aberration corrector on to the image plane to form a spectral image.

The radiation to be imaged (e.g., analyzed, measured, or recorded) using the optical systems of the invention may comprise a beam having a wavelength, for example, from about 0.12 µm to about 20 µm; from about 0.2 µm to about 2.5 µm.

FIG. 7 provides additional materials and information on transmission ranges that may be used to make components of the optical systems disclosed herein.

In yet another aspect, the invention generally relates to a method for imaging a radiation. The method includes: receiving a radiation from a source object; refracting the radiation through a transmissive aberration corrector; projecting the refracted radiation onto an aberration-corrected concave diffraction grating thereby generating a diffracted radiation from the diffraction grating, wherein the aberration-corrected concave diffraction grating includes a plurality of grooves that are unparallel or not equally-spaced; refracting the diffracted radiation through the transmissive aberration corrector; and projecting the refracted radiation from the second transmissive aberration corrector on to the image plane to form a spectral image.

The design flexibility of this invention may be accomplished through distance and angles between the components, radius of curvature of gratings, aberration corrector, materials of aberration corrector, etc. (See, e.g., Chapter 7 in "Diffraction Gratings" by M. C. Hutley; Chapter 7 in "Diffraction Gratings and Applications" by Erwin G. Loewen and Evgeny Popov. The design of the optical systems may be added by optical design software such as Zemax, Code V, etc.

Beneficial features of the optical systems and spectrometers of the invention include:

(1) The system includes an aberration-corrected concave grating, for example with non-equal spaced and curved fringe patterns. A particular fringe pattern (e.g., grooves) may be designed in association with the transmissive aberration corrector(s) for particular applications or utilities. This feature allows much more freedom and flexibility in the design and arrangement of the optical components in particular and the optical system in general. Additional geometric freedom and positioning options among the entrance slit, the aberration corrector(s), the concave grating, and the image recorder (or detector) enable the spectrometers of the invention to provide unique functionalities and utilities.

(2) In common flat field concave grating, its flatness of spectral image plane and its spatial resolution is improved from those in Rowland gratings. But there are still not good enough, especially when the field of view increases. The optical system of the invention is superior to common flat field concave gratings in both spectral resolution and spatial resolution in large field of view.

(3) The optical systems of the invention offers superior dispersion than reflective Offner spectrometers, where dispersion cannot be large as the diffraction beam would be blocked by the convex grating if the dispersion of the grating increases beyond a pertain threshold. The optical systems of the invention are not so constrained.

(4) The optical systems of the invention allow dimension flexibilities. For example, more compact imaging systems may be designed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes.

EQUIVALENTS

The representative examples which follow are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples which follow and the references to the scientific and patent literature cited herein. The following examples contain important additional information, exemplification and guidance which can be adapted to the practice of this invention in its various embodiments and equivalents thereof.

What is claimed is:

1. An optical system, comprising:
   an entrance for receiving a radiation from a source object;
   a first transmissive aberration corrector in optical communication with the entrance;
   an aberration-corrected concave diffraction grating in optical communication with the first transmissive aberration corrector, wherein the aberration-corrected concave diffraction grating includes a plurality of grooves that are non-parallel and unequally-spaced;
   a second transmissive aberration corrector in optical communication with aberration-corrected concave diffraction grating; and
   an image plane in optical communication with the second transmissive aberration corrector for recording a spectral image of the entrance slit, wherein the radiation of the source object is refracted through the first transmissive aberration corrector, projected onto and diffracted from the aberration-corrected concave diffraction grating, refracted through the second transmissive aberration corrector before projected on to the image plane to form the spectral image.

2. The optical system of claim 1, wherein the entrance comprises a slit or an aperture.

3. The optical system of claim 1, wherein the first transmissive aberration corrector comprises a transparent block of material that is transmissive to radiation having a wavelength of from about 0.13 µm to about 20 µm.

4. The optical system of claim 1, wherein the aberration-corrected concave diffraction grating comprises non-parallel and unequally spaced grooves having a density from about 50 lines/mm to about 3,000 lines/mm.

5. The optical system of claim 4, wherein the aberration-corrected concave diffraction grating comprises non-parallel and unequally spaced grooves having a density from about 200 lines/mm to about 2,000 lines/mm.

6. The optical system of claim 1, wherein the first transmissive aberration corrector comprises a curved receiving surface in optical communication with the entrance.

7. The optical system of claim 1, wherein the first transmissive aberration corrector comprises a flat receiving surface in optical communication with the entrance.

8. The optical system of claim 1, wherein the first transmissive aberration corrector comprises a curved output surface in optical communication with the aberration-corrected concave diffraction grating.

9. The optical system of claim 1, wherein the first transmissive aberration corrector comprises a flat output surface in optical communication with the aberration-corrected concave diffraction grating.

10. The optical system of claim 1, wherein the second transmissive aberration corrector comprises a curved receiving surface in optical communication with the aberration-corrected concave diffraction grating.

11. The optical system of claim 1, wherein the second transmissive aberration corrector comprises a flat receiving surface in optical communication with the aberration-corrected concave diffraction grating.

12. The optical system of claim 1, wherein the second transmissive aberration corrector comprises a curved output surface in optical communication with the image plane.

13. The optical system of claim 1, wherein the second transmissive aberration corrector comprises a flat output surface in optical communication with the image plane.

14. The optical system of claim 1, wherein the first and second transmissive aberration correctors are made of $MgF_2$, UV grade fused silica, standard grade fused silica, BK7 (Schott), Sapphire, Ge or Si.

15. The optical system of claim 14, wherein the first and second transmissive aberration correctors are made of UV grade fused silica or BK7.

16. The optical system of claim 1, wherein the aberration-corrected concave diffraction grating comprises a photoresistant material.

17. The optical system of claim 1, comprising
    two entrances each of which is receiving a radiation from a source object, and
    two image planes, corresponding to the two entrances respectively, each of the image planes is in optical communication with the second transmissive aberration corrector for recording a spectral image of the corresponding entrance.

18. The optical system of claim 17, wherein the aberration-corrected concave diffraction grating comprises a metal coating.

19. The optical system of claim 17, wherein the aberration-corrected concave diffraction grating comprises a protective layer.

20. The optical system of claim 17, wherein the two image planes are geometrically inverse in the display of component wavelengths in relation to the corresponding two entrances.

21. An optical system, comprising:

an entrance for receiving a radiation from a source object;

a transmissive aberration corrector in optical communication with the receiving slit;

an aberration-corrected concave diffraction grating in optical communication with the first transmissive aberration corrector, wherein the aberration-corrected concave diffraction grating includes a plurality of grooves that are non-parallel and unequally-spaced; and an image plane in optical communication with the second transmissive aberration corrector for recording a spectral image of the entrance slit, wherein the radiation of the source object is refracted through the transmissive aberration corrector, projected onto and diffracted from the aberration-corrected concave diffraction grating, refracted through the transmissive aberration corrector again before projected on to the image plane to form the spectral image.

22. The optical system of claim 21, comprising two entrances each of which is receiving a radiation from a source object, and two image planes, corresponding to the two entrances respectively, each of the image planes is in optical communication with the second transmissive aberration corrector for recording a spectral image of the corresponding entrance.

23. The optical system of claim 22, wherein the two image planes are geometrically inverse in the display of component wavelengths in relation to the corresponding two entrances.

24. A method for imaging a radiation, comprising:

receiving a radiation from a source object;

refracting the radiation through a first transmissive aberration corrector;

projecting the refracted radiation onto an aberration-corrected concave diffraction grating thereby generating a diffracted radiation from the diffraction grating, wherein the aberration-corrected concave diffraction grating includes a plurality of grooves that are non-parallel and unequally-spaced;

refracting the diffracted radiation through the second transmissive aberration corrector; and projecting the refracted radiation from the second transmissive aberration corrector on to the image plane to form a spectral image.

\* \* \* \* \*